(12) United States Patent
Cheslow

(10) Patent No.: US 7,516,159 B2
(45) Date of Patent: Apr. 7, 2009

(54) EXTENSION OF XQUERY IN A HIGH PERFORMANCE XML/XQUERY DATABASE

(75) Inventor: Robert D. Cheslow, Los Angeles, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 473 days.

(21) Appl. No.: 10/914,877

(22) Filed: Aug. 10, 2004

(65) Prior Publication Data

US 2006/0036578 A1 Feb. 16, 2006

(51) Int. Cl.
*G06F 7/00* (2006.01)

(52) U.S. Cl. .................... 707/104.1; 707/100

(58) Field of Classification Search ............ 707/104, 707/100, 104.1; 709/217, 228; 705/2, 1
See application file for complete search history.

(56) References Cited

U.S. PATENT DOCUMENTS

| | | | |
|---|---|---|---|
| 6,654,734 B1 | 11/2003 | Mani et al. ............ 707/2 |
| 6,718,371 B1 | 4/2004 | Lowry et al. .......... 709/213 |
| 6,918,107 B2 | 7/2005 | Lucas et al. | |
| 7,171,404 B2 | 1/2007 | Lindblad et al. | |
| 2002/0169788 A1 | 11/2002 | Lee et al. ............. 707/104.1 |
| 2004/0015783 A1* | 1/2004 | Lennon et al. ........ 715/523 |
| 2004/0060006 A1 | 3/2004 | Lindblad et al. | |
| 2004/0078219 A1 | 4/2004 | Kaylor et al. | |
| 2004/0167915 A1* | 8/2004 | Sundararajan et al. ... 707/100 |
| 2004/0267900 A1 | 12/2004 | Hoekstra et al. | |
| 2005/0021512 A1 | 1/2005 | Koenig | |
| 2005/0289125 A1* | 12/2005 | Liu et al. ............. 707/3 |
| 2006/0036463 A1 | 2/2006 | Patrick et al. | |

OTHER PUBLICATIONS

Warnill, Chung et al., "An Extension of Xquery for Moving Objects over GML". Information Technology: Coding and Computing, 2004. Proceedings. ITCC 2004, International Conference on Las Vegas, NV, USA. Apr. 5-7, 2004, Piscataway, NJ, USA, IEEE, vol. 2, Apr. 5, 2004, pp. 142-147.

Ji-Hoon Kang et al., "An Xquery Engine for Digital Library Systems that support XML date", Applications and the Internet Workshops, 2004. Saint 2004 Workshops, 2004, International Symposium on Jan. 26-30, 2004, Piscataway, NJ, USA, IEEE, Jan. 26, 2004, pp. 233-237.

\* cited by examiner

*Primary Examiner*—Charles Rones
*Assistant Examiner*—Fariborz Khoshnoodi
(74) *Attorney, Agent, or Firm*—Patrick J. S. Inouye; Scott E. Smith; Krystyna Szul

(57) ABSTRACT

A system for extension of XQuery in a binary object XML repository includes XQuery interpreter capabilities for implementing the XQuery language in the binary object XML repository. A function dispatcher module implements an XQuery call mechanism, with the function being defined by the name of the function, the number of arguments taken by the function, and the datatypes of the arguments. A plug-in function library manager implements the client side of the binary object XML repository plug-in function application program interface, and a dynamically-linked plug-in function library module for implements the server side of the binary object XML repository plug-in function application program interface.

6 Claims, 2 Drawing Sheets

EXTENSION OF XQUERY IN A HIGH PERFORMANCE XML/XQUERY DATABASE

CROSS REFERENCE TO RELATED APPLICATIONS

The following copending applications, U.S. application Ser. No. 10/915,529, filed Aug. 10, 2004, titled "High Performance XML Storage Retrieval System and Method", U.S. application Ser. No. 10/914,903, filed Aug. 10, 2004, titled "Full-Text Search Integration in XML Database", and U.S. application Ser. No. 10/914,876, filed Aug. 10, 2004 titled "Integrated Support in an XML/XQuery Database for Web-based Applications", are assigned to the same assignee of the present application. The entire disclosures of these copending applications are totally incorporated by reference in their entirety.

INCORPORATION BY REFERENCE

The following U.S. patents are fully incorporated herein by reference: U.S. Pat. No. 6,654,734 ("System and Method for Query Processing and Optimization for XML Repositories"); U.S. Pat. No. 6,718,371 ("XML-Based Integrated Services Framework"); and U.S. Pat. Appl. Pub. No. 2002/0169788 ("System and Method for Automatic Loading of an XML Document Defined by a Document-Type Definition into a Relational Database Including the Generation of a Relational Schema Therefor").

BACKGROUND

This disclosure relates generally to a computer software system and associated method for providing additional functionality for querying and formatting XML, and more particularly to implementation of an API that permits plug-in libraries of functions in other languages within XQuery.

Extensible Markup Language (XML) is a programming language operating as an extension to HTML and providing enhanced control of content. It may be used to define the content of a document (such as a Web page) rather than the presentation of it or to exchange information and documents between diverse systems. XML is text-based and formats data by using document tags to catalog information. Key elements in a document may be categorized according to meaning, enabling a search engine to scan an entire document for the XML tags that identify individual pieces of text and images rather than selecting a document by the metatags listed in its header.

There are various strategies for storing and managing XML documents. In XML repositories based on relational database technology, the XML is stored using a method known as "shredding". In this approach, the markup is broken up and stored in fields of database tables, and XML queries are translated into a relational query language (e.g. SQL, Structured Query Language) that retrieves the values from the database using relational operations, and generates the markup output. Overhead for storage is high, and performance for regeneration of the XML (or "round-tripping" of entire XML documents) is typically low. Other database managers designed specifically for XML utilize indexing schemes to process the markup representation of XML more efficiently.

Applications for querying XML databases (such as XQuery, a general-purpose XML query language) often require the ability to perform full-text search on the stored data. The search functionality must be integrated within the query language to allow for control over the structures to be searched, and to make search results available to other XQuery constructs. The XQuery specification contains a set of set forth in the XQuery specification functions that can be called from within query expressions, and also allows for user-defined functions that are written in XQuery.

An example of one approach to querying XML documents is presented in U.S. Pat. No. 6,654,734 to Mani et al. ("System and Method for Query Processing and Optimization for XML Repositories"). The query system of Mani et al. views the data in XML documents as a graph that allows queries on content, structure, inter-document links, and intra-document links. The query language is based on tree pattern match semantics using XML semantics, with features that allow the query system to compute a document type definition for the query language and use it to validate the user query formulation. Query optimization is accomplished using schema-based optimization and index-based optimization. The structure pattern is then converted to a string for storage purposes.

Another approach is described in U.S. patent application Publication No. 2002/0169788 to Lee et al. ("System and Method for Automatic Loading of an XML Document Defined by a Document-Type Definition into a Relational Database Including the Generation of a Relational Schema Therefor"). Under the system of Lee et al., a relational schema is created out of a DTD, and XML data is loaded into the generated relational schema that adheres to the DTD. Starting with a DTD for an XML document containing data, all of the information in the DTD is captured into metadata tables, and then the metadata tables are queried to generate the relational schema. The data contained in the XML document can then be loaded into the generated relational schema.

While the XQuery specification provides certain functionality within set forth in the XQuery specification functions, and other functionality can be added via user-defined functions written in XQuery, some functionality required for applications using XQuery can not be efficiently implemented within XQuery, and there is no mechanism for linking to externally implemented functions. It would be desirable to provide a mechanism to dynamically link to externally implemented functions in "plug-in" libraries to enhance functionality.

BRIEF SUMMARY

The disclosed embodiments provide examples of improved solutions to the problems noted in the above Background discussion and the art cited therein. There is shown in these examples an improved system for extension of XQuery in a binary object XML repository. The system includes XQuery interpreter capabilities for implementing the XQuery language in the binary object XML repository. A function dispatcher module implements an XQuery call mechanism, with the function being defined by the name of the function, the number of arguments taken by the function, and the datatypes of the arguments. A plug-in function library manager implements the client side of the binary object XML repository plug-in function application program interface, and a dynamically-linked plug-in function library module for implements the server side of the binary object XML repository plug-in function application program interface.

In another embodiment, there is provided a method for extension of XQuery for a binary object XML repository having an XQuery interpreter module, a function dispatcher module, a plug-in function library manager, and a plug-in function library module. The method includes implementing the XQuery language in the binary object XML repository and preparing to execute a function. A function is defined by the name of the function, the number of arguments taken by the function, and the datatypes of the arguments. The software determines whether the function is a built-in or user-defined XQuery function, with a built-in function being one that is specified as part of the XQuery language. If the function is a built-in or user-defined XQuery function, the computer code for the function is executed. If the function is not a built-in or user-defined XQuery function, a determination is made as to whether the function has been declared in a plug-in library. If the function has been declared in a plug-in library, the function is dispatched to the declared library and the computer code for the function is executed. If the function has not been declared in a plug-in library, it is determined whether at least one plug-in library module has been added or changed. New or changed library modules are loaded is a plug-in library module has been added or changed. An undefined function error is declared if a plug-in library module has not been added or changed.

In yet another embodiment, there is disclosed an article of manufacture in the form of a computer usable medium having computer readable program code embodied in the medium. When the program code is executed by the computer, the computer performs method steps for extension of XQuery for a binary object XML repository having an XQuery interpreter module, a function dispatcher module, a plug-in function library manager, and plug-in function library modules. The method includes implementing the XQuery language in the binary object XML repository and preparing to execute a function. A function is defined by the name of the function, the number of arguments taken by the function, and the datatypes of the arguments. The software determines whether the function is a built-in or user-defined XQuery function, with a built-in function being one that is specified as part of the XQuery language. If the function is a built-in or user-defined XQuery function, the computer code for the function is executed. If the function is not a built-in or user-defined XQuery function, a determination is made as to whether the function has been declared in a plug-in library. If the function has been declared in a plug-in library, the function is dispatched to the declared library and the computer code for the function is executed. If the function has not been declared in a plug-in library, it is determined whether at least one plug-in library module has been added or changed. New or changed library modules are loaded is a plug-in library module has been added or changed. An undefined function error is declared if a plug-in library module has not been added or changed.

BRIEF DESCRIPTION OF THE DRAWINGS

The foregoing and other features of the embodiments described herein will be apparent and easily understood from a further reading of the specification, claims and by reference to the accompanying drawings in which:

DETAILED DESCRIPTION

The system and method described herein are based on the extension of XQuery through the use of externally implemented functions in "plug-in" libraries. Libraries of functions are implemented in an executable module that can be linked to a system for management of XML data. For the purposes herein, the system for the management of XML data will be described as BOXR (Binary Object XML Repository), but it is noted that other such systems may be utilized. The libraries of functions can be linked to the BOXR process using the operating system dynamic linking mechanism. BOXR loads and interrogates the module through an application program interface (API) to determine the names and calling conventions for each function in the library. These functions are then made available within XQuery. The API also gives plug-in library functions access to BOXR internal functions for accessing XML datatypes, executing other XQuery functions, etc.

XQuery, a language specification from the W3C standards committee allows querying of XML documents. XQuery also specifies functions which process or filter XML data. A set of built-in functions, those set forth in the XQuery specification, is specified as part of the language, and other functions (user-defined functions) can be defined by the query-writer as part of a query.

In the following description numerous specific details are set forth in order to provide a thorough understanding of the system and method. It would be apparent, however, to one skilled in the art to practice the system and method without such specific details. In other instances, specific implementation details have not been shown in detail in order not to unnecessarily obscure the present invention.

Various computing environments may incorporate capabilities for providing extension of XQuery in XML databases. The following discussion is intended to provide a brief, general description of suitable computing environments in which the method and system may be implemented. Although not required, the method and system will be described in the general context of computer-executable instructions, such as program modules, being executed by a single computer. Generally, program modules include routines, programs, objects, components, data structures, etc., that perform particular tasks or implement particular abstract data types. Moreover, those skilled in the art will appreciate that the method and system may be practiced with other computer system configurations, including hand-held devices, multi-processor systems, microprocessor-based or programmable consumer electronics, networked PCs, minicomputers, mainframe computers, and the like.

The method and system may also be practiced in distributed computing environments where tasks are performed by remote processing devices that are linked through a communications network. In a distributed computing environment, program modules may be located in both local and remote memory storage devices.

Figure 1:
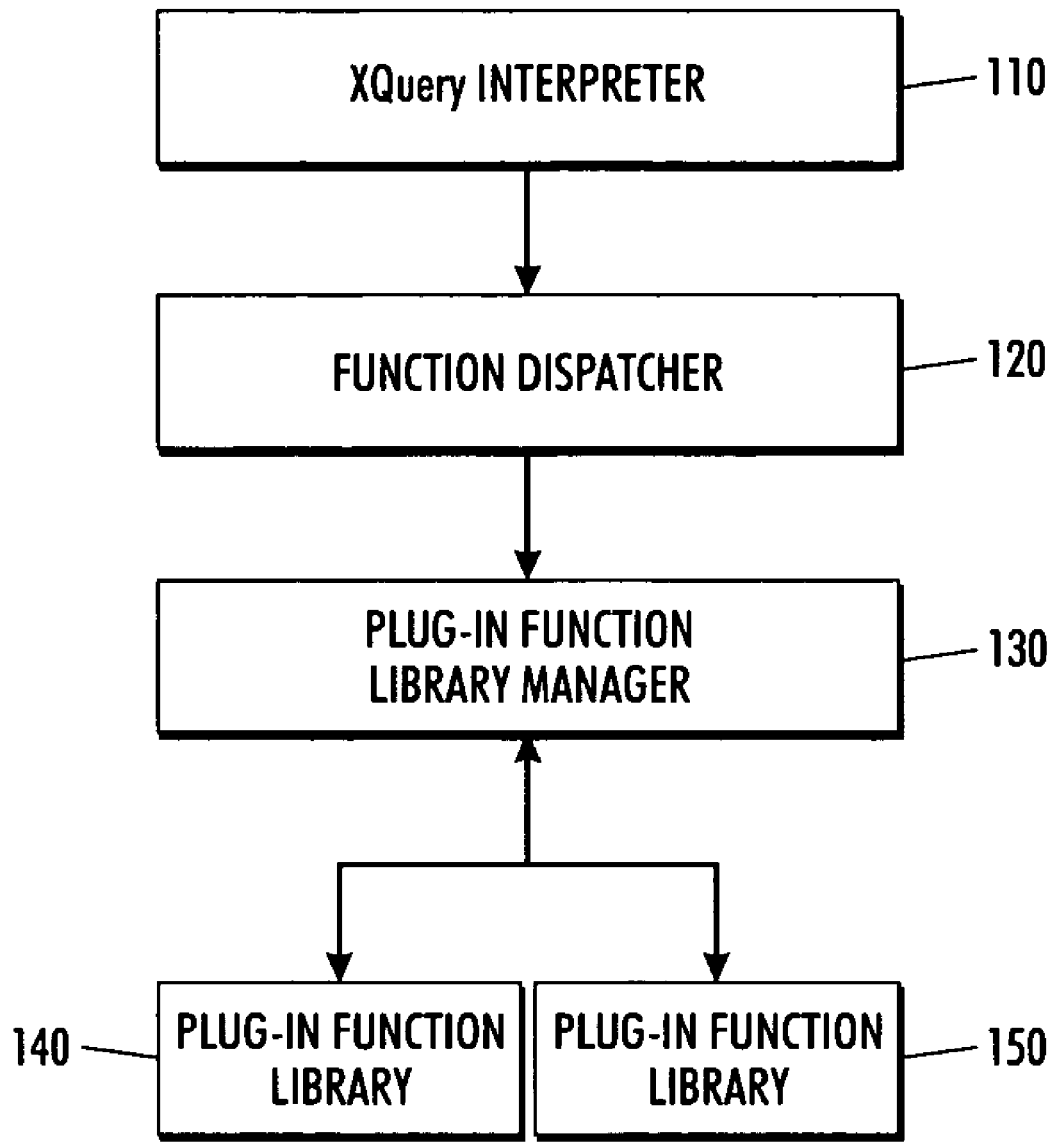
FIG. 1 is a schematic diagram of an example embodiment of the extension of XQuery in an XML/XQuery database system.

Referring to FIG. 1, the schematic diagram illustrates an embodiment of the system for extension of XQuery in an XML/XQuery database. BOXR XQuery interpreter module 110 implements the XQuery language, accepting queries and returning results. The function dispatcher 120 operates as a code module that implements the XQuery function calling mechanism. When the XQuery interpreter encounters a function call, the interpreter invokes the function dispatcher. The function dispatcher evaluates the arguments, and attempts to locate the code associated with the body of the function. If there is no built-in definition of the function in question, the function dispatcher invokes the plug-in function library manager 130 to attempt to load the function code from a plug-in library. Thus the query interpreter 110 invokes the function dispatcher 120, which in turn invokes the plug-in function library manager 130 and sends the argument values to it. The plug-in function library manager 130 interrogates the dynamically-linked libraries (140, 150, etc) that have been installed with the system using BOXR Plug-In Function API (Application Program Interface) to find a library that implements the function in question. If this is successful, the code corresponding to the function in question is executed within the plug-in library, which returns the results to the plug-in function library manager 130, which in turn returns the results to the function dispatcher 120, and the dispatcher returns the results of the function call back to 110.

As mentioned above, function dispatcher module 120 implements an XQuery function call mechanism. As an example of such a call, the substitute function may take three arguments: substitute (string, old new). The first argument ("string") specifies the string which is to be processed, the second argument ("old") is the character or substring to find and replace, and the third argument ("new") is the character or string to insert. Together the name of the function, "substitute", the arity of the function (the number of arguments it takes), which is 3, and the datatypes of the argument (all strings in this example) define the specific function code that is required to execute. The function dispatcher looks up this information in a built-in table to see if this particular function is a built-in function, or a user-defined function. When that fails, the plug-in mechanism described above attempts to locate and execute the code in a plug-in library.

As mentioned above, plug-in function library manager 130 implements the client side of BOXR plug-in API. Library manager 130 finds, interrogates, and loads plug-in function libraries. The BOXR engine implements an API that allows developers to write libraries of functions for XQuery. These "plug-in" libraries report to BOXR information regarding the functions that are implemented—the function names and arity and parameter datatypes for each function. The functions are registered by a dynamic linking mechanism, and BOXR makes these functions available for use. Thus, to add additional functions to BOXR, a library module can simply be placed in a specified location, and BOXR will automatically register the functions for use. Function registration is accomplished at startup time, but whenever a function that is currently undefined is encountered, BOXR will re-scan the library directory to see if additional libraries have been added that may contain the new function. In this way, new functions can be added even as the BOXR engine is running.

Plug-in function library modules 140 and 150 are shared, dynamically-linked libraries implementing the server side of the BOXR plug-in API and functionality for library functions. The standard string functions defined in the XQuery specification are implemented as a plug-in library, to improve modularity of the engine. Other libraries that are included with the standard BOXR distribution include functions to send and receive email, format text (e.g. finding email addresses and formatting them as mailto: links for HTML), and generate highlighted excerpts for the results of full-text search queries as described in U.S. application Ser. No. 10/914,903, filed Aug. 10, 2004, titled "Full-Text Search Integration in XML Database", incorporated by reference hereinabove.

Figure 2:
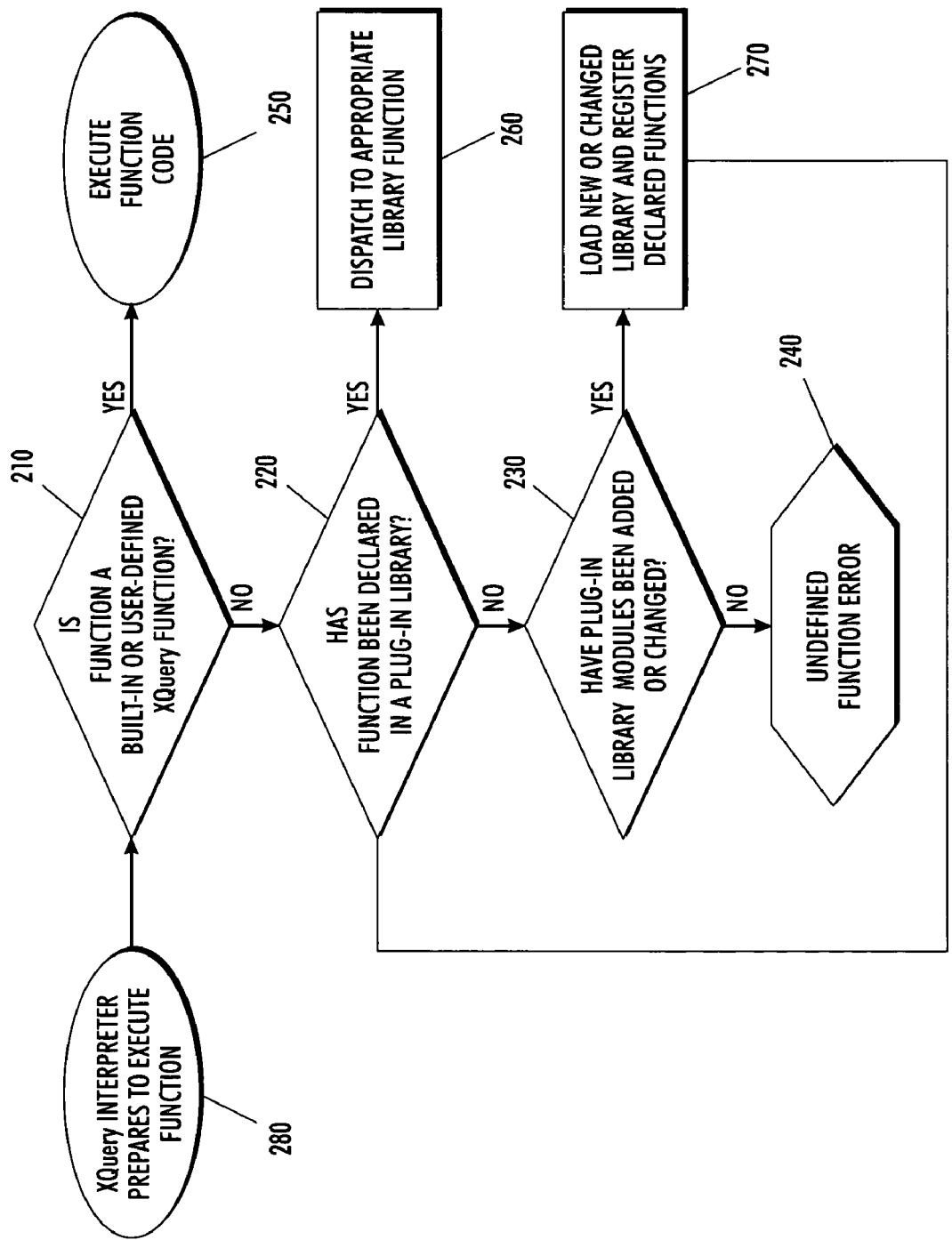
FIG. 2 is a flowchart demonstrating one embodiment of the method for extension of XQuery in an XML/XQuery database system.

Turning now to FIG. 2, the flowchart illustrates one embodiment of the method for extension of XQuery in an XML/XQuery database. At 280 the XQuery interpreter prepares to execute a function. As the interpreter executes a query, each statement in the query is executed in turn. If the next statement is a function call, the interpreter prepares to execute the function call by invoking the function dispatcher. A determination is made at 210 as to whether the function is a built-in or user-defined XQuery function. If the function is a built-in or user defined XQuery function, the function code is executed at 250. If the function is not a built-in or user defined XQuery function, a determination is made at 220 as to whether the function has been declared in a plug-in library.

If the function has been declared in a plug-in library, it is dispatched to the appropriate library function at 260 and the function code is executed at 250. If the function has not been declared in a plug-in library, an assessment is made as to whether plug-in library modules have been added or changed at 230. If the plug-in library modules have been added or changed, the software loads the new or changed library and modules and registers declared functions at 270 and returns to 220 to determine whether the function has been declared in a plug-in library. If plug-in library modules have not been added or changed, then at 240 and undefined function error is declared.

While the present discussion has been illustrated and described with reference to specific embodiments, further modification and improvements will occur to those skilled in the art. Additionally, "code" as used herein, or "program" as used herein, is any plurality of binary values or any executable, interpreted or compiled code which can be used by a computer or execution device to perform a task. This code or program can be written in any one of several known computer languages. A "computer", as used herein, can mean any device which stores, processes, routes, manipulates, or performs like operation on data. It is to be understood, therefore, that this disclosure is not limited to the particular forms illustrated and that it is intended in the appended claims to embrace all alternatives, modifications, and variations which do not depart from the spirit and scope of the embodiments described herein.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed:

1. A computer-implemented system for providing an extension of XQuery function interpretation through a binary object XML repository, comprising:
   a processor;
   a storage device configured to store computer executable program code;
   a binary object XML repository comprising a plurality of XQuery functions that each comprise an XQuery query with arguments; and
   an XQuery interpreter module configured to interpret each such XQuery function comprising values for the arguments, comprising:
      a function dispatcher module configured to evaluate the arguments of the XQuery function comprising a name of the XQuery function, an arity of the XQuery function, and datatypes of the arguments, and to locate code associated with the XQuery function comprising one of a built-in XQuery function, user-defined XQuery function, and a XQuery function module implemented in a plug-in library; and
      upon the XQuery function comprising the plug-in library XQuery function module, a plug-in function library manager configured to send values for the arguments and to execute the plug-in library XQuery function module within the plug-in library, wherein the XQuery interpreter module is configured to interrogate a plurality of plug-in libraries installed with the binary object XML repository to locate the plug-in library implementing the code associated with the XQuery function and to check a built-in table for the XQuery function comprising one of the built-in XQuery function and the user-defined XQuery function, and wherein the XQuery interpreter module is further configured to return results from execution of the plug-in library XQuery function module and the plug-in XQuery function library module is registered with the binary object XML repository through dynamic linking.

2. The system according to claim 1, wherein, upon the XQuery function comprising one of the built-in XQuery function and the user-defined XQuery function, the function dispatcher module is configured to execute the XQuery function with the values for the arguments, and the XQuery interpreter module is configured to return results from execution of the XQuery function.

3. The system according to claim 1, wherein the plug-in XQuery function library module implements functions selected from the group comprising send and receive email, format text, and generate highlighted excerpts.

4. A computer-implemented method for providing an extension of XQuery function interpretation through a binary object XML repository, the computer-implemented method comprising:

a processor configured to execute the computer-executable program on computer executable program modules;

a memory storage device configured to store computer executable program code;

providing a binary object XML repository comprising a plurality of XQuery functions that each comprise an XQuery query with arguments; and interpreting each such XQuery function comprising values for the arguments, comprising:

evaluating the arguments of the XQuery function comprising a name of the XQuery function, an arity of the XQuery function, and datatypes of the arguments;

locating code associated with the XQuery function comprising one of a built-in XQuery function, user-defined XQuery function, and a XQuery function module implemented in a plug-in library;

interrogating a plurality of plug-in libraries installed with the binary object XML repository to locate the plug-in library implementing the code associated with the XQuery function;

checking a built-in table for the XQuery function comprising one of the built-in XQuery function and the user-defined XQuery function; and upon the XQuery function comprising the plug-in library XQuery function module, sending values for the arguments and executing the plug-in library XQuery function module within the plug-in library;

registering the plug-in XQuery function library module with the binary object XML repository through dynamic linking; and returning results from execution of the plug-in library XQuery function module.

5. The method according to claim 4, further comprising:

upon the XQuery function comprising one of the built-in XQuery function and the user-defined XQuery function, executing the XQuery function with the values for the arguments; and returning results from execution of the XQuery function.

6. The method according to claim 4, wherein the plug-in XQuery function library module implements functions selected from the group comprising send and receive email, format text, and generate highlighted excerpts.

* * * * *